(12) United States Patent
Matter

(10) Patent No.: US 12,490,777 B2
(45) Date of Patent: Dec. 9, 2025

(54) SOCK AND A METHOD OF KNITTING A SOCK

(71) Applicant: Taylor Matter, Alexandria, VA (US)

(72) Inventor: Taylor Matter, Alexandria, VA (US)

(*) Notice: Subject to any disclaimer, the term of this patent is extended or adjusted under 35 U.S.C. 154(b) by 189 days.

(21) Appl. No.: 18/378,777

(22) Filed: Oct. 11, 2023

(65) Prior Publication Data

US 2024/0032610 A1 Feb. 1, 2024

Related U.S. Application Data

(63) Continuation-in-part of application No. 17/530,408, filed on Nov. 18, 2021, now abandoned.

(51) Int. Cl.
| | |
|---|---|
| *A41B 11/00* | (2006.01) |
| *A41B 11/02* | (2006.01) |
| *B32B 3/12* | (2006.01) |
| *B32B 3/26* | (2006.01) |
| *B32B 5/02* | (2006.01) |
| *B32B 5/14* | (2006.01) |

(Continued)

(52) U.S. Cl.
CPC ............ *A41B 11/005* (2013.01); *A41B 11/02* (2013.01); *B32B 3/12* (2013.01); *B32B 3/263* (2013.01); *B32B 5/02* (2013.01); *B32B 5/142* (2013.01); *B32B 25/10* (2013.01); *B32B 27/12* (2013.01); *B32B 2250/40* (2013.01); *B32B 2250/44* (2013.01); *B32B 2307/546* (2013.01); *B32B 2307/56* (2013.01); *B32B 2307/7376* (2023.05); *B32B 2437/00* (2013.01)

(58) Field of Classification Search
CPC ..... A41B 11/005; A41B 11/02; A41B 11/007; B32B 3/12; B32B 3/263; B32B 5/02; B32B 5/142; B32B 25/10; B32B 27/12; B32B 2307/7376; B32B 2307/56; B32B 2307/546; B32B 2250/44; B32B 2250/40; B32B 2437/00; A43B 21/32; A41D 13/06; D04B 1/26

See application file for complete search history.

(56) References Cited

U.S. PATENT DOCUMENTS

| | | | | |
|---|---|---|---|---|
| 3,259,915 A | * | 7/1966 | Dison ................ | A41B 11/005 |
| | | | | D2/980 |
| 4,373,215 A | * | 2/1983 | Guigley ................ | D04B 1/26 |
| | | | | 2/239 |

(Continued)

*Primary Examiner* — Catherine A. Simone
(74) *Attorney, Agent, or Firm* — Boris Leschinsky

(57) ABSTRACT

A method of producing a double-layered sock with a cushion patch positioned between an external and an internal layer of yarn or fabric is provided. The method comprises the external layer over the internal layer of a tubular lay flat fabric. The method also comprises attaching a first polymer cushion patch to the external or internal layer about two inches from one end. The method also comprises a step of attaching a second polymer cushion patch to the external layer about five inches from the first cushion patch. After drawing the external layer over the internal layer, the cushion patch is encased inside the sock. The cushion patch has a honeycomb grid pattern and includes one or two areas of high compression having larger hexagonal cells designed to distribute high compression impact away and throughout the cushion patch, thereby improving user comfort during walking or running.

11 Claims, 13 Drawing Sheets

(51) Int. Cl.
 B32B 25/10 (2006.01)
 B32B 27/12 (2006.01)

(56) References Cited

U.S. PATENT DOCUMENTS 6,108,820 A * 8/2000 Bernhardt ............ A41B 11/0052/409
2018/0020742 A1 * 1/2018 Johnson ................ A41B 11/0012/239

* cited by examiner

SOCK AND A METHOD OF KNITTING A SOCK

CROSS-REFERENCE TO RELATED APPLICATIONS

The present patent application is a continuation-in-part of the co-pending U.S. patent application Ser. No. 17/530,408 filed 18 Nov. 2021 with the same title, which in turn claims a priority date benefit from the U.S. Provisional Patent Application No. 63/116,325 filed Nov. 20, 2020, all incorporated herein by their respective entireties.

FIELD OF THE INVENTION

The present disclosure is in the field of foot apparel. More particularly, the present disclosure provides systems and methods of constructing a sock with a polymer, elastomeric material, polyurethane, or gel patch between an outer layer and an inner layer to create a cushioned sock at the ball and heel of the foot, the cushion patch encapsulated between the outer and inner layers.

BACKGROUND

The ball and heel of the human foot support a significant amount of total body weight. When walking, running, climbing, and carrying objects, the ball and heel bear even greater weight. Ankle, knee, back, and neck pain can be reduced by using quality footwear that provides cushioning and protection. Such footwear includes socks in addition to shoes. A sock of high quality absorbs perspiration and also keeps the foot warm.

Double-layered socks are generally known. These socks provide enhanced insulation and warmth, making them an excellent choice for cold weather conditions. The double layers trap a layer of air between them, creating an extra barrier against the cold, which can be particularly beneficial for outdoor activities in winter. Additionally, double-layered socks can help reduce friction and prevent blisters, as the inner layer rubs against the outer layer rather than the skin of the foot, reducing the risk of chafing and discomfort during long walks or hikes. However, there are also some drawbacks to double-layered socks. One major disadvantage is that they tend to be bulkier than single-layered socks, which can make them less comfortable in tight-fitting shoes. In addition, sliding of one layer against the other may create slippage and make walking less comfortable. An improved design of a double-layered sock is therefore needed to address these detriments.

Polymer cushions and patches for use with socks are also generally known. They provide innovative additions to socks designed to enhance comfort and alleviate pressure or pain in specific areas of the foot, typically the heel or ball area. The advantages of incorporating these features into socks are numerous. Firstly, they provide targeted cushioning, offering extra support and shock absorption to reduce discomfort and fatigue, making them ideal for individuals with foot conditions such as plantar fasciitis or metatarsalgia. Secondly, they can help prevent or alleviate blisters and calluses by reducing friction and shear forces between the foot and the shoe. Additionally, some patches are removable, allowing for customization and ease of cleaning. However, there are also some disadvantages to consider. The added thickness of the cushions or patches may make it challenging to fit into some shoes, especially those with a snug or narrow design. Moreover, the additional cost associated with these specialized socks can deter budget-conscious consumers. Finally, while they can provide comfort and support, they may not be a suitable solution for severe foot problems, where professional medical intervention is required. Overall, polymer sock cushions and patches can be a valuable accessory for those seeking enhanced comfort and foot support, despite their limitations. An improved sock design for a polymer patch is needed to address at least some of the limitations of the prior art socks.

SUMMARY

A sock and method of knitting a sock such that an elastomeric cushion patch is made from silicone or another similar material, which is encased between an external and an internal layer of the sock. The sock is produced by drawing the external layer completely over the internal layer to invert thereof such that the exterior surface of the external layer becomes an interior surface covering entirely an exterior surface of the internal layer, thereby the tubular fabric forms the double-layer sock. The cushion patch is permanently attached to either one or both the external layer and the internal layer of the sock, and surrounded by yarn, fiber, or thread layers. The cushion patch is provided in the form of one or more elastic patches having a honeycomb structure that provides cushioning for the foot and may extend the life of the sock. Various manufacturing systems and methods are provided and described herein.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF THE INVENTION

Figure 1:
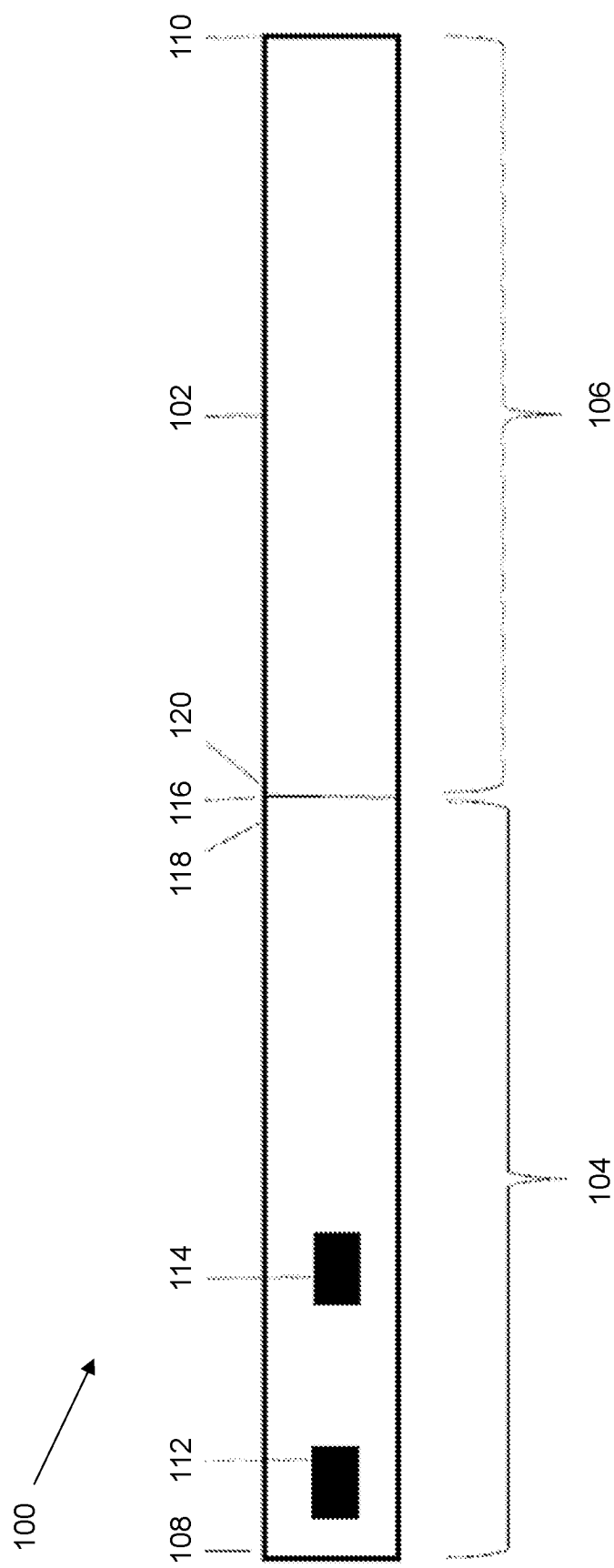
FIG. 1 is a block diagram of a system of a double-layered sock containing a pair of cushion patches at the ball and heel of the foot, according to an embodiment of the present disclosure.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Systems and methods described herein provide for producing a double-layered sock made from a single tube of fabric or yarn or from two separate tubes in which one or more cushion patches are positioned between two layers and are not visible to a user. A first cushion patch is positioned at a ball area of the user's foot, and the second cushion patch is positioned at the heel area. The patches provide cushioning and comfort for the user at points where the user's weight rests most heavily and distribute the weight to other adjacent areas of the foot. The patches may also extend the useful life of the double-layered sock.

The sock is produced from a single continuous lay flat tube of fabric that is folded onto itself to form two layers. Alternatively, the sock is produced from two separate lay flat tubular fabrics that are joined similarly. An external layer of the tube is folded over to completely envelop an internal layer. As the far end or circumference of the external layer is pulled over and completely encases the internal layer, the internal layer may be pulled through the interior of the external layer. The result of this action is a double-layered tube where one end must be sewn to close either a toe section or finalize a welt area at the top of the sock, depending on the placement of the cushion patches.

In some embodiments, prior to the folding and enveloping action described above, the two cushion patches are placed on the side of the external layer of the fabric tube that is closed over atop the other side thereof. The side holding the patches, once folded over, then faces inward to the outward-facing surface of the internal layer of the tube. The toe or welt section may then be sewn depending on the original placement of the patches as described below.

In other embodiments, the patches are placed on the outward-facing side of the internal layer prior to folding over the external layer to cover the patches from the external side, as the invention is not limited in this regard.

The two patches are affixed to the fabric with adhesive or by melting while in contact with the fabric. One exemplary method of producing the cushion patch is to start with a silicone gel mixed with 3% of its catalyst. Silicon is filled into a metal mold containing the mirrored patch grid profile engraved using a computer numerically controlled (CNC) machine. A heel patch mold may be used separately from a ball patch mold. Details of the grid geometry are described below in greater detail. The mold filled with the silicone gel is placed at the desired location (ball or heel) on the inner layer of the sock. The mold is compressed with the fabric and heated in a double-plate compression machine. The heat of an upper plate may be set to 105° C., and the heat of a lower plate may be set to 95° C. under air pressure of 2 HP for two minutes and 20 seconds. The pressure is then relieved, and the mold is removed, leaving the patch profile securely attached to the inner layer of the sock.

Once the external layer is folded and closed over atop the internal layer, the double-layer sock with cushion patches affixed within thereof is stretched over a foot form. The form is passed through temperature of 160° C. for 20 seconds and applied air pressure of 2 HP.

Systems and methods provide that the two halves of the fabric tube become the two layers of the double-layer sock. Because the two halves begin as a single continuous lay flat fabric tube and are not physically cut or separated, each of the two halves effectively comprises one of the two layers of the sock.

Turning to the figures, FIG. 1 is a block diagram of a system of a double-layered sock. FIG. 1 depicts the components of a sock 100 and a method of knitting a sock as provided herein.

Figure 2:
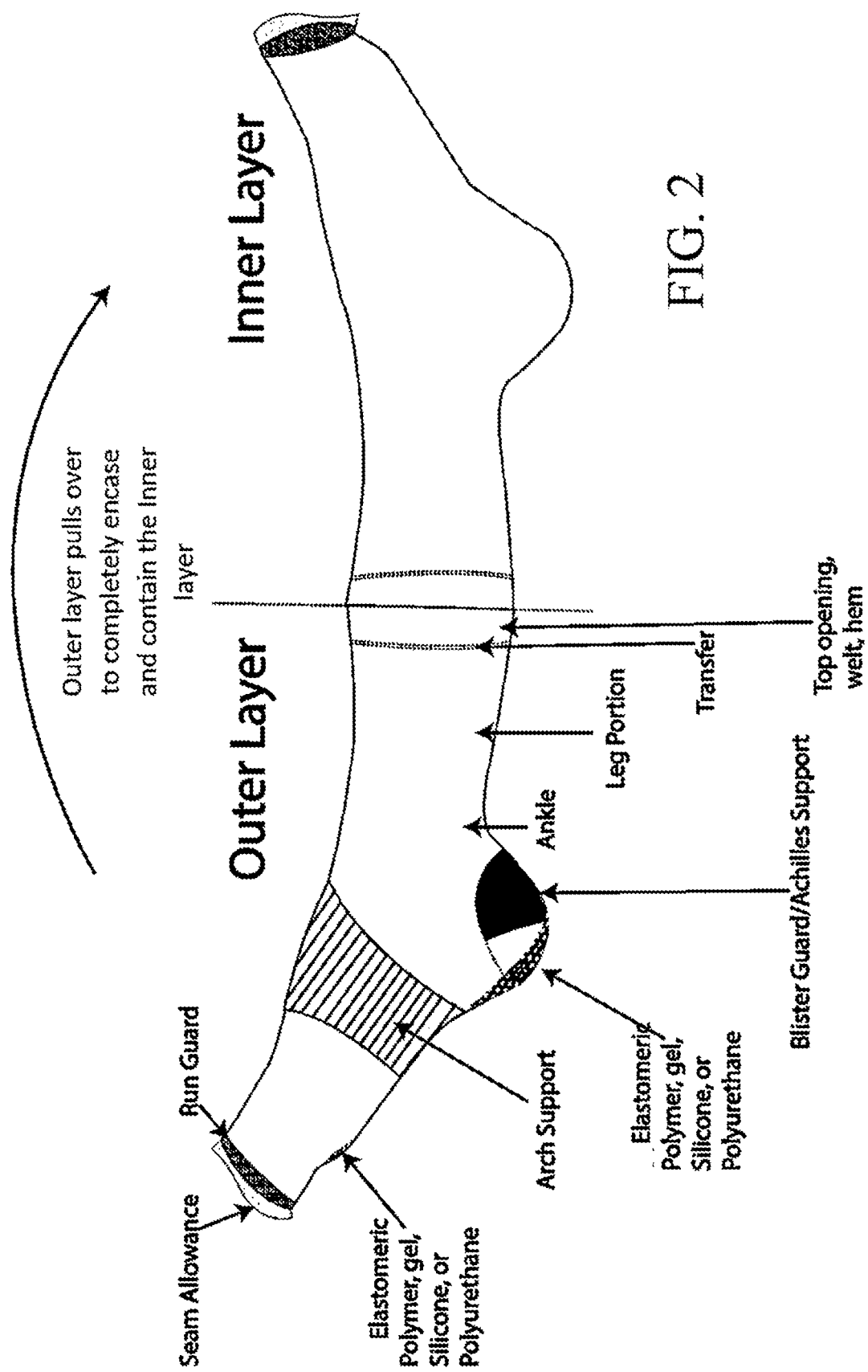
FIG. 2 is a diagram of a system of a double-layered sock containing cushion patches at the ball and heel of the foot, according to an embodiment of the present disclosure.
Figure 3:
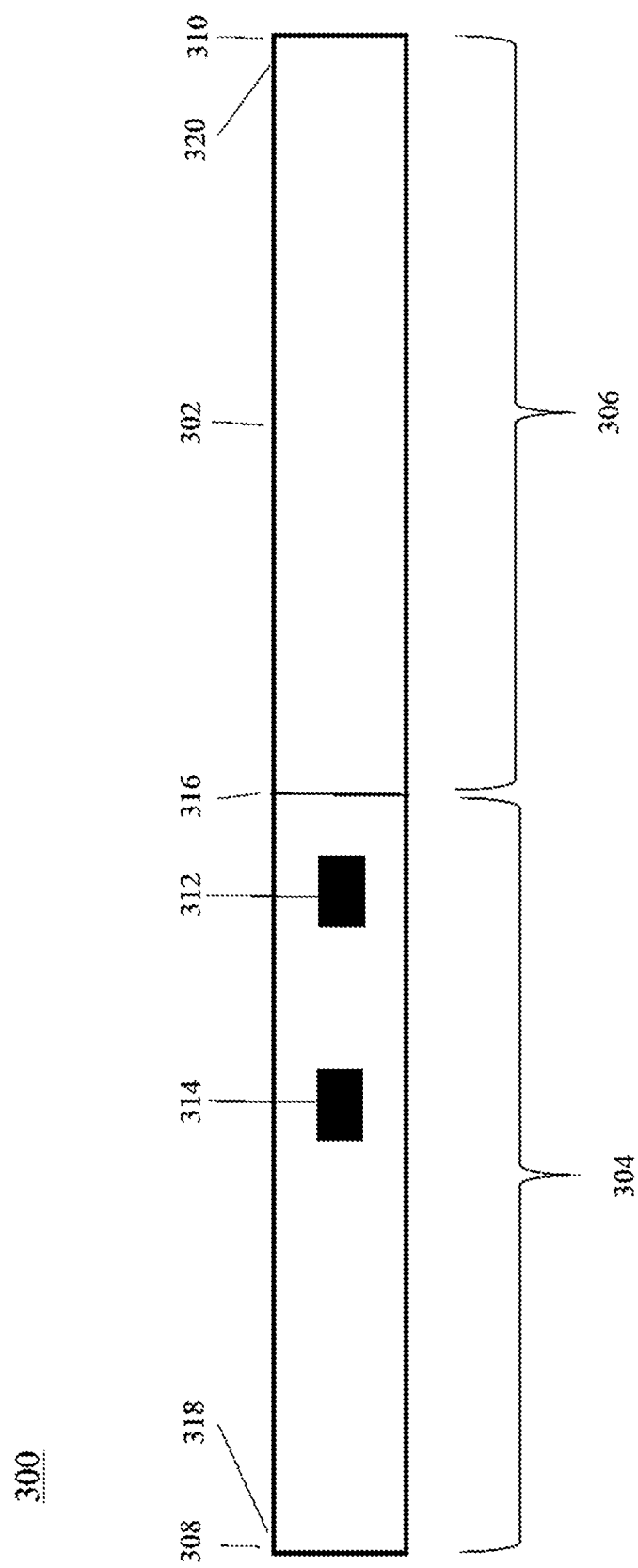
FIG. 3 is a block diagram of a system of a double-layered sock containing cushion patches at the ball and heel of the foot, according to an embodiment of the present disclosure.
Figure 4:
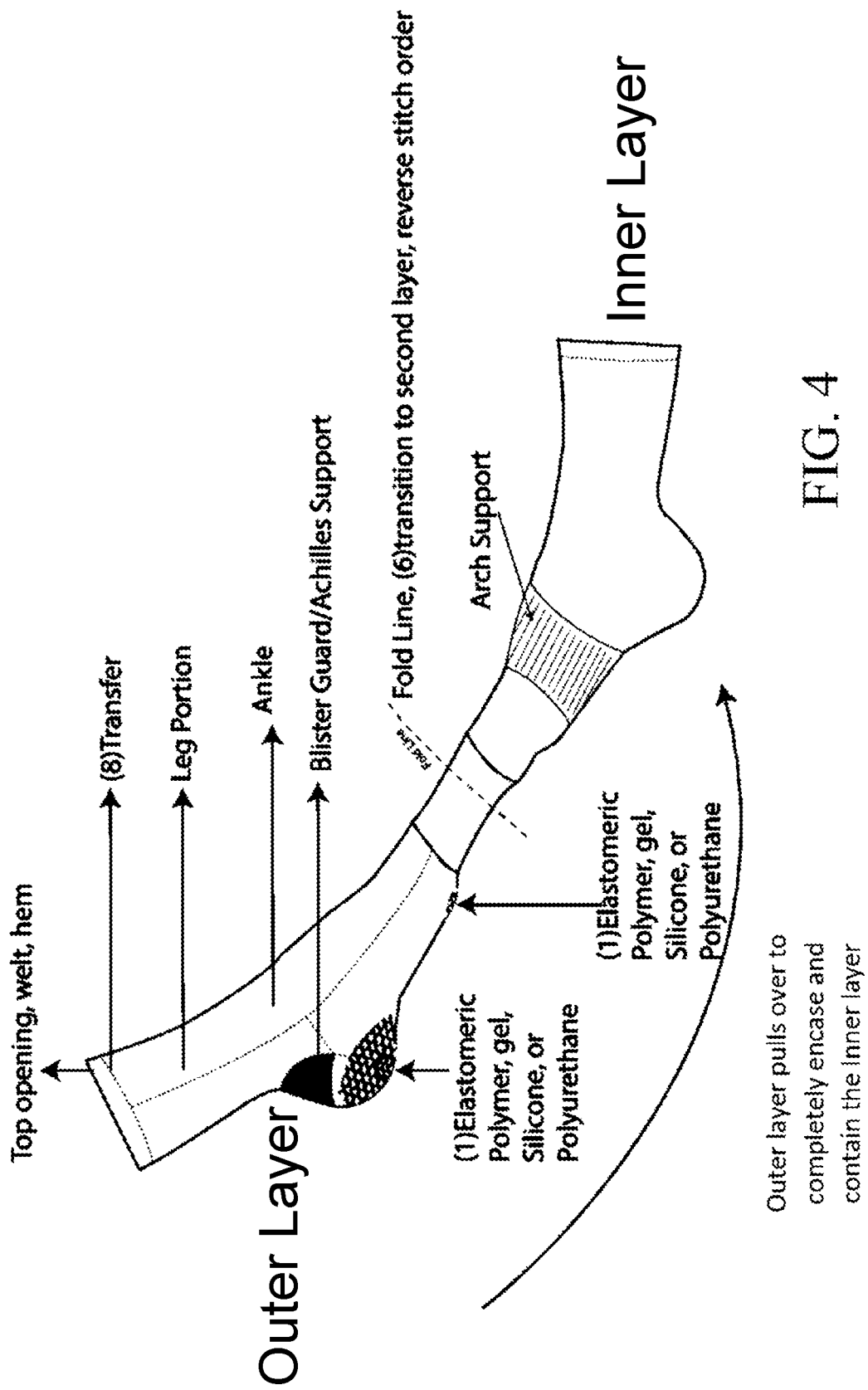
FIG. 4 is a diagram of a system of a double-layered sock containing cushion patches at the ball and heel of the foot, according to an embodiment of the present disclosure.

As noted, the double-layered structure of the sock 100 is made possible by folding one half of a fabric tube (for example, the half that holds two cushion patches) over the other half of the tube. The present disclosure provides for two embodiments:

(a) the fabric tube in which the sock halves are joined at the welt before inverting, as seen schematically in FIG. 1 and in more detail in FIG. 2, and (b) the sock in which the two halves are joined at the toe, as seen schematically in FIG. 3 and in more detail in FIG. 4.

FIG. 1, which, as noted, corresponds to FIG. 2, and illustrates the sock 100, which comprises a fabric tube 102 having a left half 104, a right half 106, a left end 108, and a right end 110. The sock 100 also comprises a first cushion patch 112, a second cushion patch 114, a center point 116, a left welt 118, and a right welt 120.

The two halves 106 and 108 in FIG. 1 are connected at the center point 116 near the welts 118 and 120, as can be seen clearly in FIG. 2. The first patch 112 is affixed to the left half 104 about two inches from the left end 108, which is the toe area. The first patch 112 supports the ball of the user's foot. The second patch 114 is affixed to the left half 104 about five to six inches to the right of the first patch 112 (depending on the size of the sock) and supports the user's heel.

After cushion patches 112 and 114 are firmly affixed to the left half 104, the left half 104 is pulled over the right half 106 in an enveloping manner such that the left half 104 entirely encases and contains the right half 106. This action could be aided by pulling the right half 106 through the center point 116 and into the interior of the left half 104 as the left half 104 is being closed over the right half 106.

The result of the folding and enveloping action described above is that what had been the outward-facing surface of the left half 104 that holds the patches 112 and 114 is now facing inward and in direct contact with the outward-facing surface of the right half 106. The patches 112 and 114 also face inward and are completely enclosed between the layers of the now contiguous right half 106, making the internal layer of the sock, and the former left half 104, making the external layer of the sock 100. Further, the circumference of the left end 108 now entirely encircles the circumference of the right end 110 at the toe portion of the double-layered sock. The two ends 108 and 110 are then stitched together, which closes the toe area. At the other end, where the left welt 118 and the right welt 120 are now together at the opening of the double-layer sock, the two layers may be joined.

FIG. 2 provides a more detailed view of the components of FIG. 1. The lay flat fabric tube 102, which in FIG. 2 is depicted as two socks joined at their welt areas, would not be shaped as socks during the manufacturing process described above until the double-layered sock is sewn. The double-layered structure would be placed on a form shaped like a sock to receive shaping and further treatment and be finalized as a finished product.

FIG. 2 depicts what is shown as the left half 104 and the right half 106 in FIG. 1 as an outer layer and as an inner layer, respectively. FIG. 2 also depicts components such as seam allowance, run guard, arch support, transfer, and blister guard/Achilles support that add value to the double-layered sock but may not be directly relevant to the systems and methods provided herein. Further, while cushion patches 112 and 114 are described herein as silicone, they may alternatively or additionally be made of other substances that may comprise gel, polyurethane, and/or other polymers.

FIG. 3 depicts the components and interactions of a double-layered sock 300. Components of the sock 300 are indexed to the components of the sock 100. FIG. 4 supports and supplements FIG. 3 in the same manner as FIG. 2 supports and supplements FIG. 1.

FIGS. 3 and 4 depict a second and different embodiment from the embodiment provided by FIGS. 1 and 2. Whereas in FIG. 1, the two halves 104 and 106 are joined at a top or welt area and then closed together such that thereafter the toe area is to be sewn and closed, in FIG. 3, the two halves 304 and 306 are joined at the toe and not at the top or welt as in FIG. 1.

In FIG. 3, the first cushion patch 312 is proximate to the center point 316, and the second patch 314 is about five to six inches to the left of the first patch 312 (depending on the size of the sock). This structure is in contrast with that shown in FIG. 1, where the position of the patches 104 and 106 is opposite that shown in FIG. 3.

When the left half 304 is folded over the right half 306 such that the right half 306 becomes enveloped into the left half 304 closing over the right half 306, the toe area is at the center point 316 in contrast to what takes place in FIG. 1. The left end 308 in this second embodiment would encircle the right end 310 and together the left end 308 and right end 310 when sewn together would form the welt area of the double-layered sock.

Figure 5:
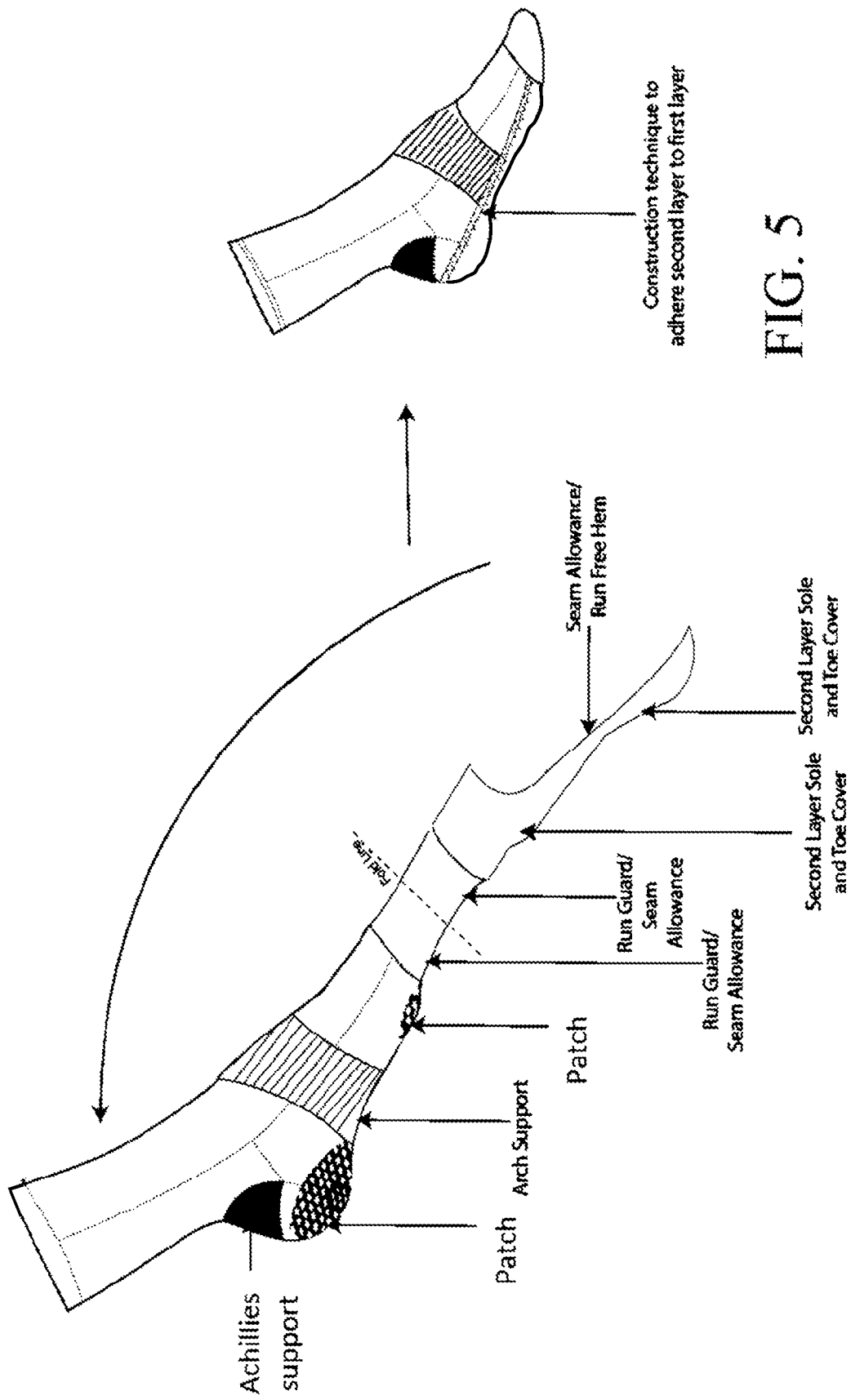
FIG. 5 is a diagram of a system of a double-layered sock containing cushion patches at the ball and heel of the foot, according to an embodiment of the present disclosure.
Figure 6:
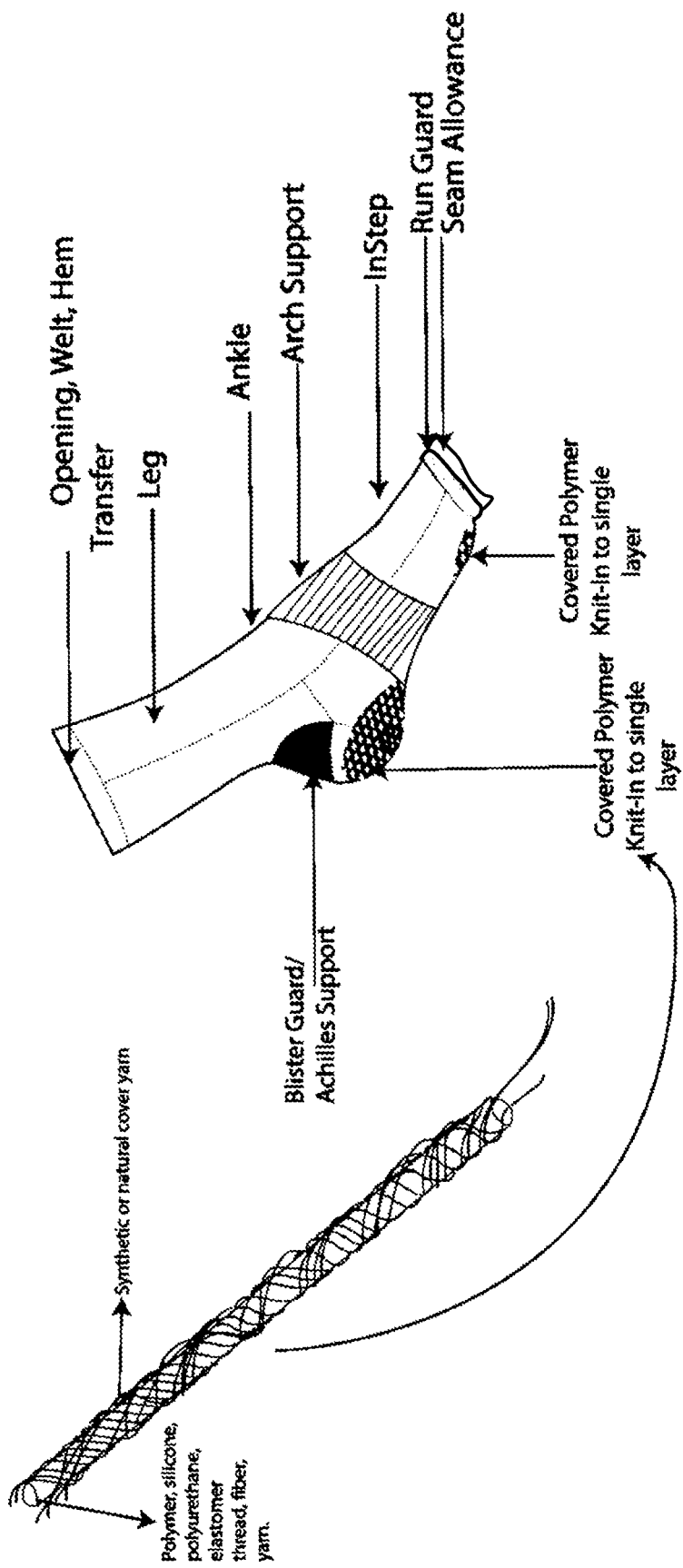
FIG. 6 is a diagram of a system of a double-layered sock containing cushion patches at the ball and heel of the foot, according to an embodiment of the present disclosure.

FIG. 5 illustrates another embodiment wherein a second layer sole and toe cover may be added to a sock. The second layer would be pulled over the sock in a right-to-left manner, as depicted in FIG. 5. The finished product is shown in a smaller image in the righthand area of FIG. 5. FIG. 6 provides further detail regarding the structure and placement of the cushion patches.

Description of Knitting Techniques

Knitting Technique A is applicable to FIG. 1, FIG. 2, and the sock 100. Knitting begins at the toe of the sock and follows accordingly:

1. First, a toe and run guard are knit, allowing for seam allowance at the toe opening, followed by continuous knitting into the ball area, further knitting into the arch area, the heel and ankle area, and then to the top opening (in a way similar to known techniques of knitting a sock). The machine then reverses the order of the knitting technique. It does not cut or break at the first knitted portion but continues to form a continuous tube comprising a first knit portion and a second knit portion.
2. The machine does not cut or drop the sock. Rather, it continues to knit the top opening, the ankle, the heel, the arch, the ball area, the toe area, and run guard and seam allowance in order to create two socks connected at a fold line or a center point, which divides the sock into two halves.
3. The sock is then steamed and shrunk for fit and allowed to dry or dried in a dryer if needed.
4. The extended sock or still-open-sock is then placed on a flat metal footboard or a 3D foot insert where the cushion patch is added to the ball of the foot and the heel area in a selected pattern.

Knitting Technique B is applicable to FIG. 3, FIG. 4, and the sock 300. Knitting begins at the opening of the sock and follows accordingly:

1. First, the sock opening and hem, transfer, or welt are knit. The ankle, then the heel, then the arch, then the ball, then the toe, then the run guard and toe seam allowance are created (as in the ordinary or known technique anyone trained in the art of sock knitting would understand).
2. The machine does not cut or drop the sock; it reverses the knitting sequence and continues to knit the toe seam allowance, toe run guard, toe area, ball area, arch area, heel area, ankle area, opening, and a second transfer, hem, welt, or end of sock.
3. The sock is then steamed and shrunk for fit and allowed to dry or dried in a dryer if necessary.
4. The extended sock or still-open-sock is then placed on a flat metal footboard or a 3D foot insert where the cushion patch is added to the ball of the foot and the heel area.

In Knitting Technique B, the hem or top opening of the sock may be created by knitting a finished welt or transfer and finished on the machine. It may also be left unhemmed or welt-free and hemmed during the final process after the application of the cushion patch. As an alternative to the knit-in welt hem, the first layer and second layer of the sock may be joined together at the opening of the sock with a cover stitch, overlock, double needle or flatlock stitch, or another method of conventional sewing of stretch knits, socks, or footwear.

Knitting Technique C is applicable to the sock shown in FIG. 5 and proceeds as follows:
1. First, the sock opening, and hem, welt, or transfer are knit. The ankle, the heel, the arch, the ball, the toe, the run guard, and the toe seam allowance are then created.
2. The machine does not cut or drop the sock; it reverses the knitting sequence and continues to knit the toe seam allowance, toe run guard, toe area, ball area, and top of sock past one to two inches from the end of toes where they join the foot. At this point, the top of the sock, just past the toe, ends the knitting and finishes before the instep (remaining top of the sock). The lower portion continues to knit through the sole, all the way to the heel, but not up to the Achilles.
3. The sock is then steamed and shrunk for fit and allowed to dry or dried in a dryer.
4. The extended sock or still-open-sock is then placed on a flat metal footboard or a 3D foot insert where the cushion patch is added to the ball of the foot and the heel area onto the first portion of the sock.
5. After the patch is applied, the second partial portion is pulled back onto the sock and stitched into place, covering the ball and the heel. It is stitched in a manner that those skilled in the art of knitting or sewing would understand.
6. The toe seam is closed.

Knitting Technique D is applicable to the sock shown in FIG. 6. A cushion patch may be incorporated as a thread. The polymer may be incorporated into the knit structure by splicing a polymer, elastomeric, or silicone-based thread or monofilament at the areas of desired cushion during the knitting process. The material could be silicone, polymer, elastomeric polymer, gel, or polyurethane.

As the machine knits a portion of the sock at the ball or the heel of the foot, whichever comes first, the knitting machine will be programmed to splice in a polymer yarn (as described above) such that added cushion is applied, but cover yarns are used to encase the thread or yarn inside of the traditional cover yarns like nylon, polyester, or cotton or other known natural or synthetic yarns.
1. The sock is knit in a single layer, beginning at the top opening of the sock or the toe. If starting at the toe, the knitting technique will be reversed, but the splicing technique or splicing areas will remain the same.
2. The hem, welt, or top opening finish is knit, followed by any leg portion of the sock and the ankle.
3. After the ankle, at the heel, a covered, elastomeric yarn is spliced in to create patch loops as in a terry cloth or piled knit structure. The elastomeric yarn acts as a cushion.
4. The elastomeric polymer can be covered with any commercial yarn, synthetic or cotton, such as nylon, polyester, cotton, rayon, cellulosic fiber, or other known yarn used in sock making.
5. The covered elastomeric polymer is spliced in at the heel.
6. After the spliced polymer is added, the sock continues to knit the instep and sole.
7. At the sole and instep where the arch is, a specified denier is added, which is heavier than what is in the base layer of the sock to provide arch support.
8. After the arch support, the ball area is knit by splicing in the covered elastomeric polymer in the specified area.
9. The toe area is knit without the covered polymer.
10. The toe is closed.
11. The sock is steamed and dried.
12. The sock is boarded.

Detailed Description of Methods to Apply a Cushion Patch

The cushion patch is applied in one of four ways.

Application method #1 uses the polymer applied as a viscous, spreadable gel formula as a screen print.
1. The sock is pulled onto a metal flat form or 3D form.
2. A metal plate with cut-outs of the shape of the desired end result shape and thickness is placed over the sock.
3. A spatula is used to spread the polymer over the metal plate, which is placed above the sock.
4. The plate then contacts the sock so as to have the sock coated with the polymer in the shape desired.

If multiple thicknesses of the polymer are desired, the polymer may be coated onto the sock in a series of successive applications until the desired thickness is achieved. If multiple patterns are required, there may be the need for multiple metal plates and allow for a suitable curing time between each application.

Application method #2 assumes that the polymer may be applied in a solid form by adhering the polymer shape directly onto the sock.
1. The sock is pulled onto a metal flat form or a 3D form.
2. A premade and cured cushion patch is placed onto the ball or the heel in a specified area of the foot and pressed and/or heat-set in place.

Application method #3 assumes that the polymer may be applied through a hot melt method.
1. The sock is pulled onto a metal flat form or a 3D form.
2. A mechanical strainer is used to press the viscous polymer directly onto the sock in the desired shape and thickness of the cushion patch.
3. The sock is then coated with the polymer in the shape desired.

If multiple thicknesses of the polymer are desired, the polymer may be coated, hot melted, or otherwise applied onto the sock in a series of successive applications until the desired thickness is achieved. If multiple patterns are required, there may be the need for multiple pattern strains and a curing time between each one.

In all of the above application methods, once the polymer is cured and set, the sock is then closed by pulling the second portion of the sock onto the first portion of the sock. This encapsulates the polymer in between the two layers of the sock.

Application method #4 assumes the polymer comes as thread, yarn, or fiber.
1. An elastomeric polymer in the form of thread, fiber, or yarn is threaded onto the knitting machine.
2. It will be covered, braided, plied, wrapped, or placed with other commercial synthetic or natural yarns.
3. The elastomeric polymer thread will be spliced into the sock at the heel or ball or as specified by the sock design.

The sock is then closed at the toe seam and is closed at the top opening, if necessary; and if needed, a stabilizing stitch is sewn at the top opening to avoid slippage for application methods 1 and 2.

Knitting Structure for Application Methods 1 and 2.

The first knit portion may contain a yarn combination inclusive of all needle heads or feeds. Some of the feeds may drop out, or fewer feeds will be included in the second sock portion. The external layer is the part of the sock that will be visible to the wearer of the sock. The toe portion may be a jersey knit structure containing a yarn combination of elastane, synthetic, and or natural fibers and any composition of those thereof. The toe portion contains a seam allowance for stitching toe seam, and a run guard for protection from toenails, stitching of the toe seam, and general wear at the toe seam. The sock body extends the run guard and seam as a jersey knit with wales and courses of a specified range but could also be made using an alternative knit structure. In knitting, a wale is a column of loops running lengthwise, corresponding to the warp of woven fabric; a course is a crosswise row of loops, corresponding to the filling. The sole at the ball and the heel may be a jersey knit (or other known knitting structure) with wales and courses of a specified range and can utilize the full needle head or feeds. The arch of the foot may have a splice in a spandex denier stronger or higher than in the body of the sock or utilize a tighter knitting structure for arch support. The spandex range at the arch may be a range of 20 denier to 210 denier, such as at least 20 denier, at least 30 denier, at least 40 denier, at least 50 denier, at least 75 denier, at least 100 denier, at least 125 denier, at least 150 denier, at least 175 denier, or up to 200 denier, with a selected range of wales and courses. The front and the back of the sock (if the sock covers the lower leg) may be a jersey knit or any other known or suitable knit structure. The cuff may be ribbed or made with any other known or suitable knit technique. The top of the instep may be a pique, jersey, or other knit stitch or a cover for the top of the foot.

In embodiments, the internal layer of the sock may be knitted with a lighter weight or a finer yarn or a yarn combination, as opposed to the first portion of the sock. This approach may be used so as not to make the sock too thick as compared to a traditional sock worn by consumers for running, walking, or wearing shoes.

The run guard and seam may be made as a jersey knit (or other known knit structure) with a specified range of wales and courses. The sole at the ball and the heel may also be made as a jersey knit (or other known knit structure) with a specified number of wales and courses and can utilize the full needle head or feeds. The arch of the foot may splice in a spandex denier higher than that used in the first portion of the sock, or use a tighter knitting structure for arch support.

Detailed Description of Polymer Selection for the Cushion Patch

The polymer structure may include an elastomeric material formed into a specific geometric pattern. This custom geometric pattern is designed in such a way as to fit naturally to the shape of the sock and be easily compatible with the polymer application methods listed above.

The design of this geometric pattern is such that the resulting grid pattern allows for adequate air and moisture transfer while providing localized support in key pressure point areas. The thickness of this polymer structure is either a varying thickness or an even thickness, with the intent to further diffuse the load at the key pressure point areas.

The material used to create the cushion patch may have the following material properties:
 (a) Hardness: 15 Shore A to 45 Shore A
 (b) Compressive Strength: 5 MPa to 35 MPa
 (c) Water Absorption: No greater than 3.00%
 (d) Density: No greater than 4.50 glee
 (e) Linear Shrinkage: No greater than 0.35 mm/mm
 (f) Modulus of rigidity (at 20° C.): No greater than 1.00 MPa These material properties may be achieved by utilizing the following exemplary groups of elastic materials:
 (a) Ethylene Propylene Diene Monomer (EDPM)
 (b) Natural Rubber (NR)
 (c) Silicone
 (d) Neoprene
 (e) Urethane or Polyurethane The geometric pattern can be scaled as needed to accommodate different sizes of the sock. Following the polymer application, the resulting polymer structure should match the pattern design shown below, with a maximum allowable deviation tolerance of no more than about 2%.

Once the cushion patch is applied, the resulting patch structure provides a targeted stress distribution, minimizing specific pressure points and providing a cushion while effectively and evenly spreading and diffusing the pressure outward across the structure.

The maximum thickness of the cushion patch is not to exceed 2.00 mm. This ensures the end product maintains flexibility and aesthetic characteristics consistent with a standard sock and is not adversely impacted by machine washing or extended wear.

Applying the cushion patch as a yarn combination may be accomplished when the first and second half of the sock are made using a combination of synthetic and natural yarns. The yarns may be twisted, braided, bundled, or covered with spandex or elastane. The sock may be made using the following combinations of yarns:
 Nylon, polyester, cotton, and spandex,
 Nylon, rayon, polyester, and spandex,
 Bamboo, rayon, polyester, and spandex,
 Nylon, cotton, and spandex,
 Polyester, cotton, and spandex,
 Cotton and spandex,
 Covered spandex,
 Bare spandex, or
 Commercial blends of all-natural, all-synthetic, or a combination of synthetic and natural fibers, including cellulosic fibers.

Detailed Description of the Cushion Patch

Figure 9:
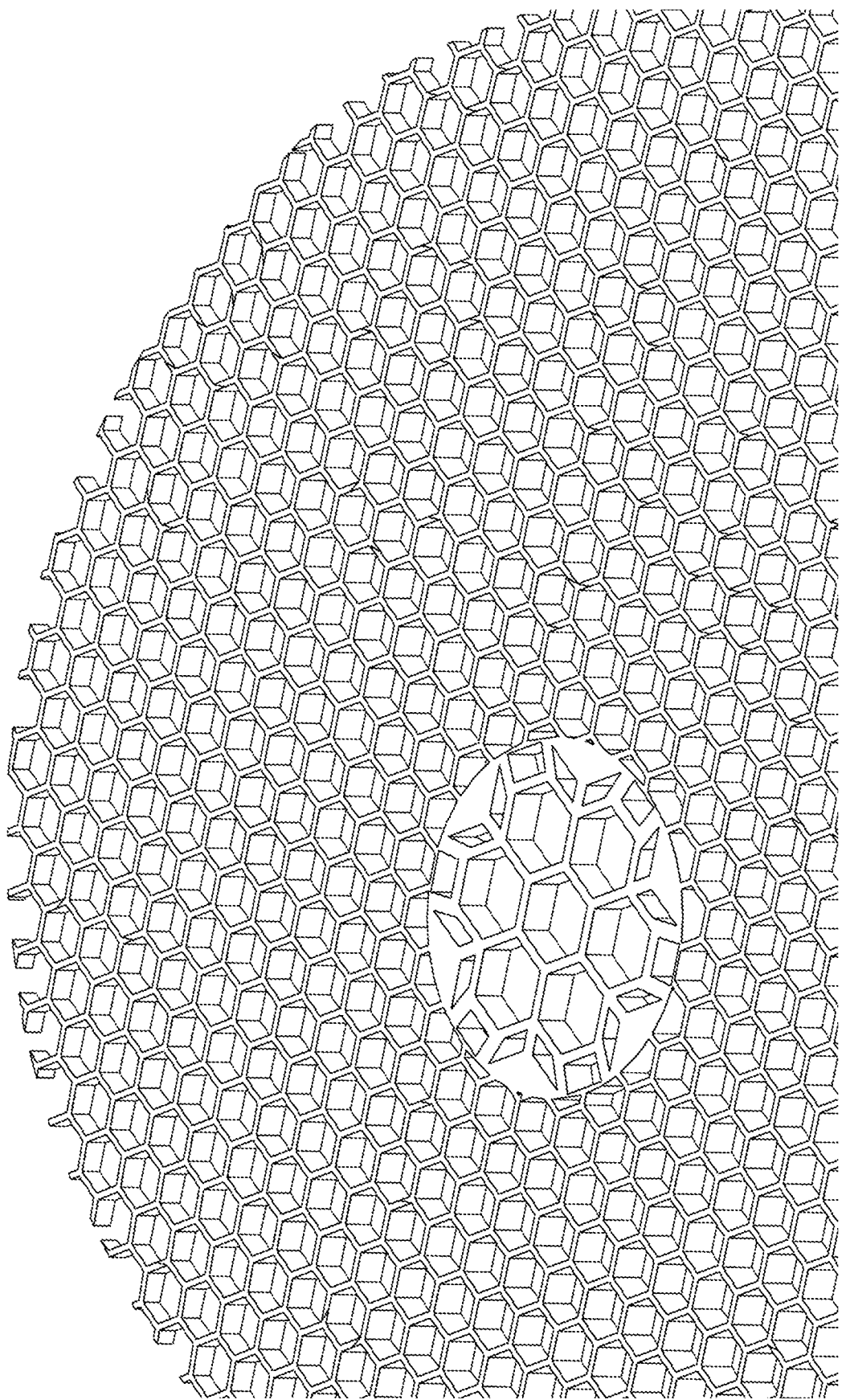
FIG. 9 is a close-up perspective view of a detail of the cushion patch showing a high-compression area of the patch in greater detail.
Figure 10:
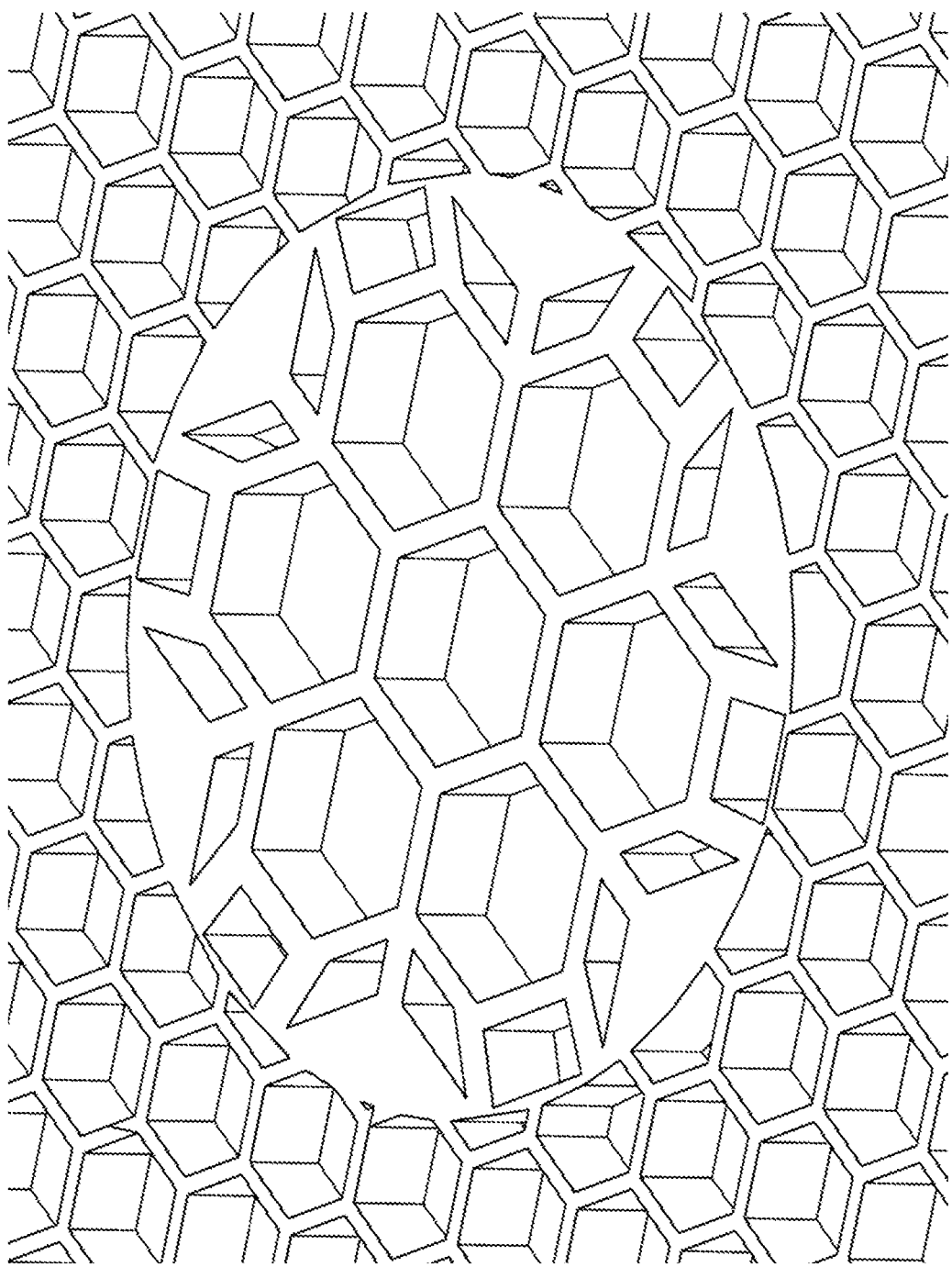
FIG. 10 is a further close-up view of what is shown in FIG. 9.
Figure 11:
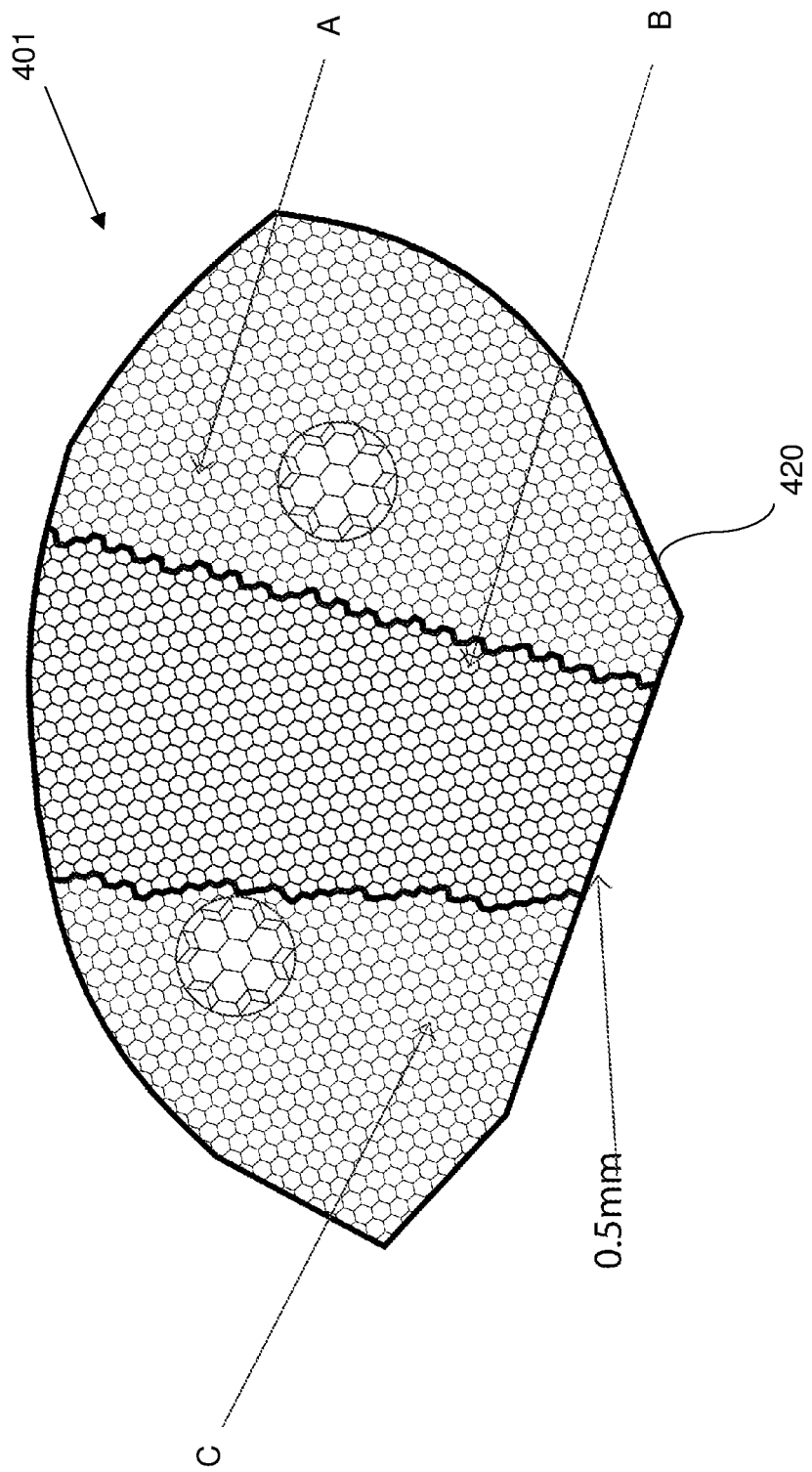
FIG. 11 shows various distinct areas of the ball cushion patch.
Figure 12:
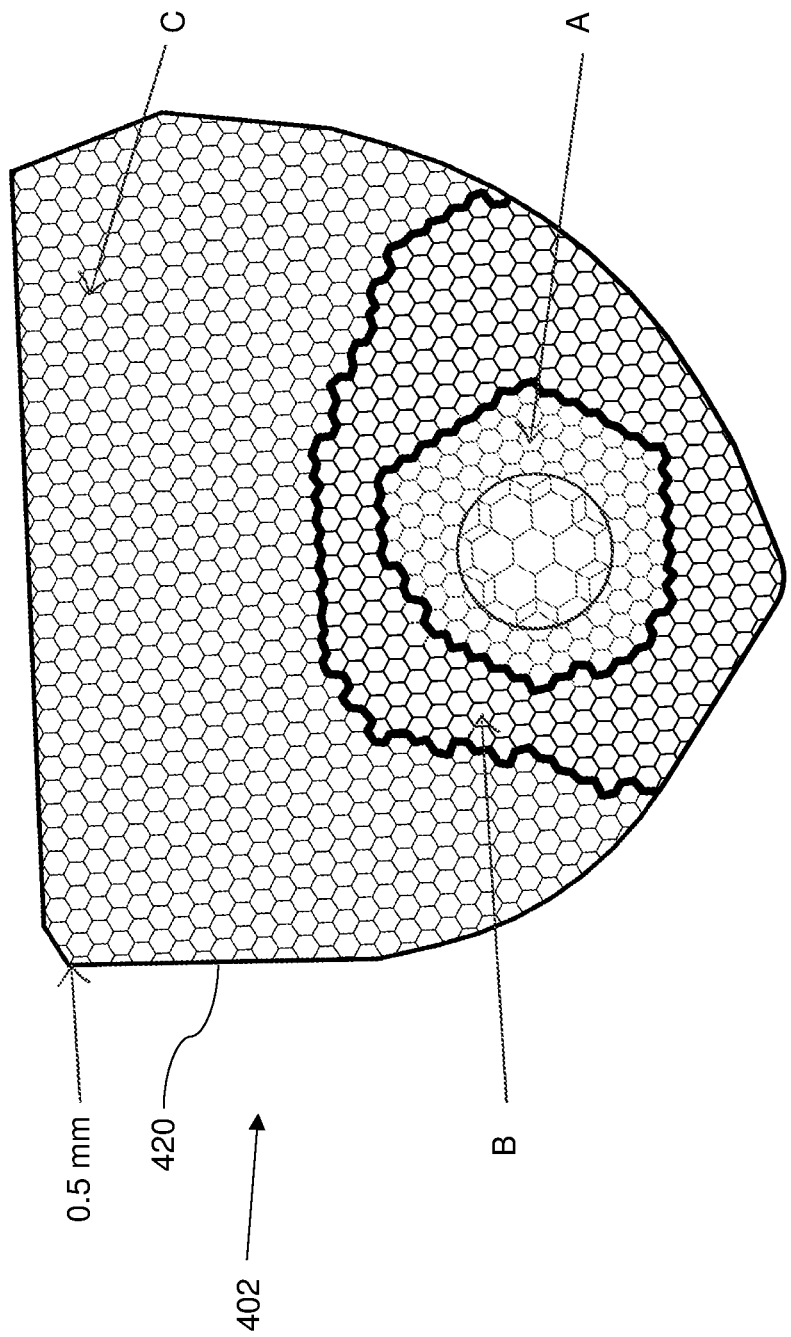
FIG. 12 shows various distinct areas of the heel cushion patch.

FIGS. 7 through 14 illustrate various aspects of the cushion patch of the present invention, which is configured to deform and stretch along with the fabric of the sock. FIGS. 11 and 12 depict various areas of the patch, including small and large grid sections and illustrate a load transfer structure of the patch.

Figure 7:
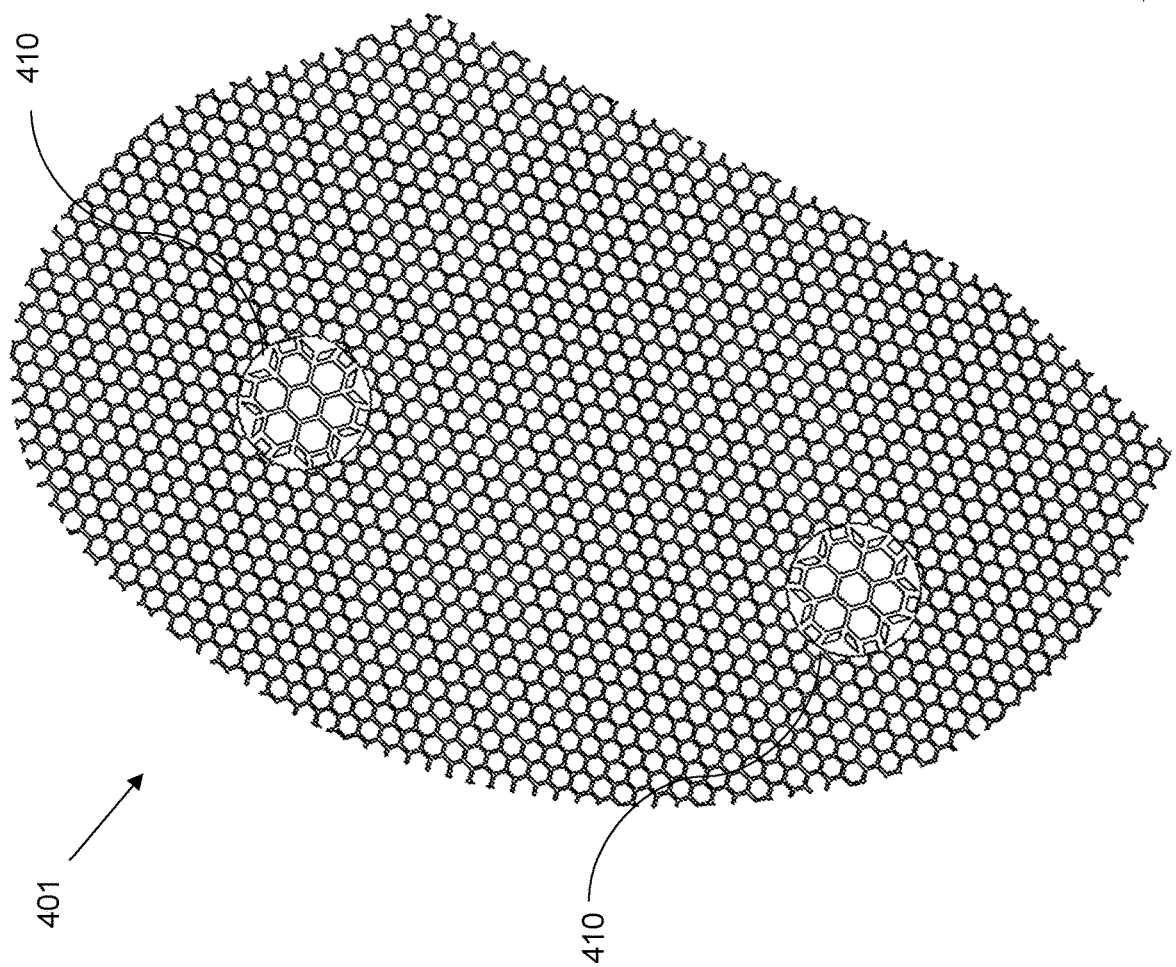
FIG. 7 is a top view of a heel polymer patch according to an embodiment of the present disclosure.
Figure 8:
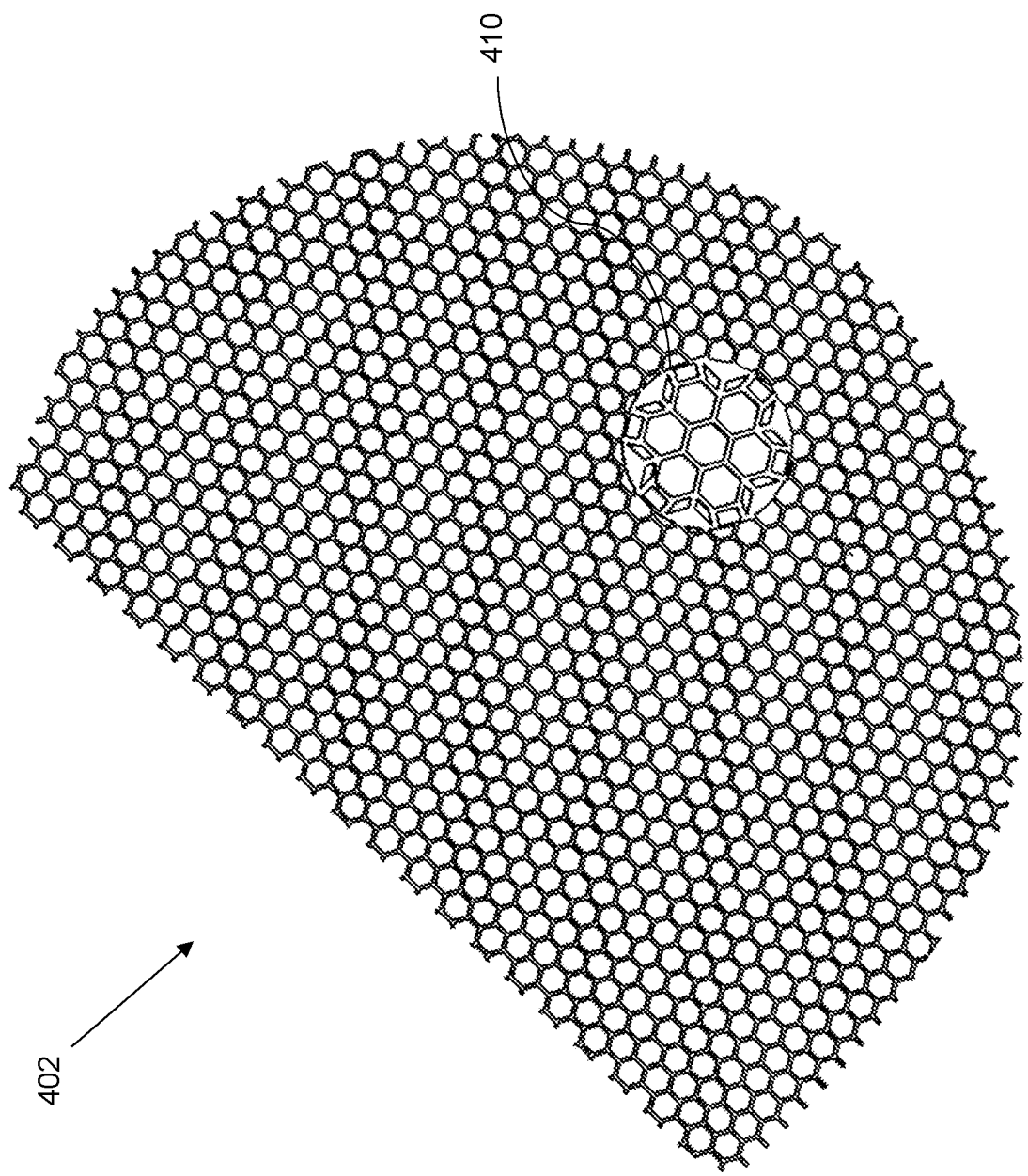
FIG. 8 is a top view of a ball polymer patch according to an embodiment of the present disclosure.

FIG. 7 shows an example of a top view (facing the toe) of a left ball cushion patch 401, and FIG. 8 shows an example of the same view of a left heel cushion patch 402. A symmetrically reflected pattern may be used for the right ball and heel patches. The ball cushion patch 401 has the general shape of an oval or a "crescent moon" with a curved convex border on one side and an almost straight border on the other side—outlining a typical compression area associated with the ball of a foot. The heel cushion 402 has the general shape of a truncated oval with a curved convex border extended around most of the patch, which is truncated by a straight-line border on one side thereof—again representing a general compression area of the heel of a foot.

A honeycomb structure is used throughout the geometric pattern of the cushion patch. It consists of a repeating pattern composed of hexagonal cells, similar to the structure of a honeybee's hive. Other repeating structures may be used to create a cushion patch of the invention, such as using triangular cells, square cells, etc. The size of the individual cells may be the same throughout the structure in some embodiments. In other embodiments, as seen in FIGS. 7 and 8, the ball cushion patch 401 may have two circular high-compression areas 410 having a different honeycomb structure with larger hexagonal cells, while the heel patch 402 may have one such high-compression area 410. The circular high-compression areas 410 may be positioned at locations of maximum compression impact when a foot is under compression during walking or running.

The size of each honeycomb cell, as measured from one inner wall to the opposite inner wall, is about 2.0 to 2.5 mm. The total wall thickness between adjacent cells is about 1 mm.

A close-up perspective view of the generally circular high-compression area 410 is seen in FIG. 9, and a further close-up is seen in FIG. 10, showing details of the position and orientation of the individual struts. The cells in the high-compression area may range in size from about 1.60 mm from side to side to about 5.00 mm from side to side, such as at least 1.60 mm, at least 1.70 mm, at least 1.80 mm, at least 2.00 mm, at least 2.50 mm, at least 3.00 mm, at least 3.75 mm, at least 4.00 mm, at least 4.50 mm, or up to 5.00 mm. The wall width may be from about 0.75 mm to 2 mm—so as to absorb the highest compression stress during walking.

The grid pattern is also designed to have cell openings so as to provide proper ventilation and moisture removal from the foot during walking.

In addition to having high-compression areas in the most stressed parts of the cushion patch, the present invention describes the design with various areas of the cushion patch having different thicknesses. In general, areas of high compression may have greater thickness than adjacent areas. That arrangement is helpful to distribute the pressure away from the high-compression areas and towards other areas of the patch so as to make it more comfortable for the user to walk.

Figure 13:
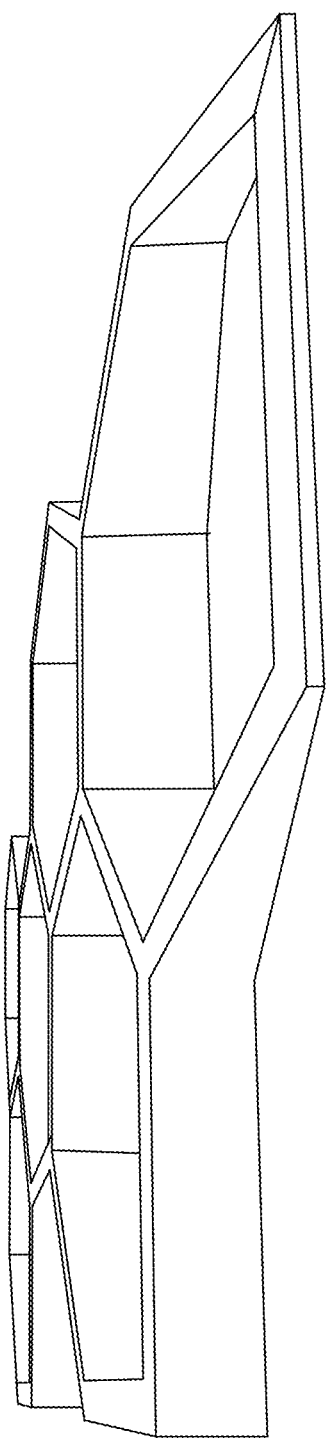
FIG. 13 shows a first perspective side view of the cells of the cushion patch in a transition from one area of the patch to another.
Figure 14:
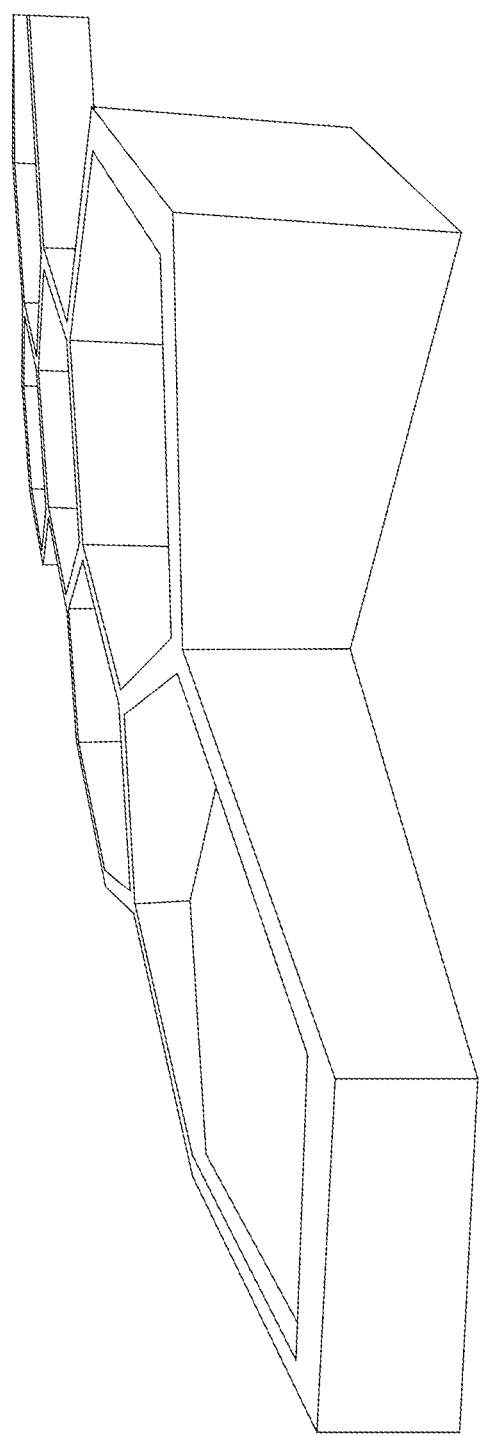
FIG. 14 shows a second perspective side view of the same.

FIG. 11 shows one example of patch 401 having a zone A with a thickness of the patch grid at 1.75 mm, zone B with a thickness of the patch grid at 1.50 mm, and zone C with a thickness of 1.00 mm. The transition from one zone to the next may be made in a gradually sloped manner, as shown in FIGS. 13 and 14.

FIG. 12 shows an example of the heel patch 402 with three thickness zones: zone A at 1.75 mm, zone B at 1.50 mm, and zone C at 1.00 mm.

Regardless of the specific thickness of the patch area, the entire border 420 surrounding the patch 401 or 402 has a reduced thickness of 0.5 mm so as to provide smooth transition from the area of the sock having the cushion patch to an adjacent area that has no patch.

In other embodiments, the areas of different grid thickness may be arranged as follows:

Ball Cushion Patch:
(a) Between $1^{st}$ & $2^{nd}$ Metatarsal Region: 1.35 mm
(b) Between $3^{rd}$ & $4^{th}$ Metatarsal Region: 1.6 mm
(c) Between $4^{th}$ and $5^{th}$ Metatarsal Region: 1.85 mm
(d) Border edge of the patch is tapered to 0.5 mm Heel Cushion Patch:
(a) Center of Heel: 1.85 mm
(b) Mid Region of Heel: 1.6 mm
(c) Exterior Region of Heel: 1.35 mm
(d) Border edge of the patch is tapered to 0.5 mm The durometer of silicone used has a shore hardness between 25 Shore A and 30 Shore A, although a range of shore hardness between 15 shore A and 45 shore A may provide similar benefits.

The use of the cushion patches described above improves shock absorption through three primary modes. The first is through the use of silicone over traditional fibers. This reduces the shock on the foot because silicone has a lower stiffness than traditional fibers, such as wool. The silicone has a stiffness of approximately 1.14 MPa, while materials such as wool have a stiffness of 2,700 MPa or higher. Since the energy absorbed by the material is linearly proportional to the stiffness of the material, the silicone rubber will absorb approximately 2,000 times the energy of wool for an equivalent design.

The second mode of improvement is the honeycomb structured reinforcement of the high-compression area of the patch placed under the ball and the heel of the foot. The honeycomb structure is designed to flex with the foot, dispersing energy through elastic deformation. The honeycomb structure features a tapered wall height that ranges from about 0.5 mm to about 1.85 mm or so but not exceeding 2.00 mm.

The third mode that makes the structure more effective than a traditional shoe or sock insert is the high elasticity of the honeycomb structure, which allows for more degrees of freedom. The additional degrees of freedom allow the honeycomb structure to flex in three directions, instead of only one direction, as is the case with traditional shoe inserts. This allows the impact energy to be dispersed during compression, the same way inserts do. However, in addition to direct compression, it also diffuses the impact energy along the length and width of the foot. The result is a shock-absorbing capability, which is more similar to how the foot would naturally disperse energy. This energy dispersion behavior reduces the amount of energy transmitted into the foot, thereby better absorbing the shock. Lastly, the high elasticity of the multidimensional structure allows for a more exact fit, so that the thickest and thinnest portions of the honeycomb structure are always fitted to the corresponding regions of the user's foot (for example, the thickest portion is always under the $4^{th}$ and $5^{th}$ metatarsal, even if one user has either a wider or a narrower foot than another).

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, Aft AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, Aft BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A double-layer sock comprising an external layer positioned over an internal layer, the double-layer cushioned sock is produced by:
   providing a tubular fabric shaped from a first end to a second end as the external layer continuing to the internal layer, wherein the internal layer has a shape that is a mirror shape of the external layer reflected about a center line of the tubular fabric,
   permanently attaching a first cushion patch to either the external layer or the internal layer part of the tubular fabric, wherein the first cushion patch is made from a polymer in a honeycomb pattern, wherein the first cushion patch is configured to deform and stretch along with the fabric of the sock,
   folding and drawing the external layer completely over the internal layer to invert thereof such that an exterior surface of the external layer becomes an interior surface covering entirely an exterior surface of the internal layer, wherein the first cushion patch is encased between the external layer and the internal layer, thereby the tubular fabric forms the double-layer sock, and
   attaching the first end to the second end.

2. The double-layer sock, as in claim 1, wherein the first cushion patch is positioned at a ball area of the sock or a heel area of the sock.

3. The double-layer cushion sock, as in claim 1, further comprising a second cushion patch encased between the external layer and the internal layer, wherein both the first cushion patch and the second cushion patch are spaced apart along the sock.

4. The double-layer sock as in claim 3, wherein the first cushion patch is positioned at a ball area of the sock and the second cushion patch is positioned at a heel area of the sock, thereby forming the double-layer sock with a ball support and a heel support.

5. The double-layer sock, as in claim 1, wherein the first cushion patch is made from at least one of a silicone, a gel, or a polyurethane.

6. The double-layer sock, as in claim 1, wherein the first cushion patch has a thickness not exceeding 2 mm.

7. The double-layer sock, as in claim 6, wherein the first cushion patch has at least three areas of different thicknesses ranging from 1.00 mm to 2.00 mm.

8. The double-layer sock, as in claim 1, wherein the first cushion patch has a thickness gradually reduced from at least 1.00 mm throughout the patch to 0.50 mm at a border edge thereof.

9. The double-layer sock, as in claim 1, wherein a grid pattern of the first cushion patch comprises at least one high-compression area having a larger cell structure and located at an area of the sock having maximum compression during use.

10. The double-layer sock, as in claim 9, wherein the high-compression area of the cushion patch is circular and comprises a honeycomb structure with individual hexagonal cells having a different size as compared to hexagonal cells adjacent to the high-compression area.

11. The double-layer sock as in claim 10, wherein the size of a hexagonal cell measured from a first side to a second side opposite the first side is from 1.60 mm to 2.00 mm.

* * * * *